(12) United States Patent
Igawa (10) Patent No.: US 6,827,171 B2
(45) Date of Patent: Dec. 7, 2004

(54) EXTERNALLY-DEVELOPED AIR BAG DEVICE

(75) Inventor: Tadahiro Igawa, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/304,831

(22) Filed: Nov. 26, 2002

(65) Prior Publication Data

US 2003/0102177 A1 Jun. 5, 2003

(30) Foreign Application Priority Data

Dec. 4, 2001 (JP) ........................................ 2001-370276

(51) Int. Cl.⁷ .............................................. B60K 28/10
(52) U.S. Cl. ..................... 180/274; 280/743.1
(58) Field of Search ................. 180/274, 271; 280/728.1, 728.2, 743.1

(56) References Cited

U.S. PATENT DOCUMENTS

| | | | | |
|---|---|---|---|---|
| 5,538,281 A | * | 7/1996 | Patercsak | ................. 280/743.1 |
| 5,806,879 A | | 9/1998 | Hamada et al. | |
| 5,957,486 A | * | 9/1999 | Taguchi et al. | ............. 280/729 |
| 6,176,509 B1 | | 1/2001 | Kawaguchi et al. | |
| 6,182,782 B1 | | 2/2001 | Matsuura et al. | |
| 6,244,624 B1 | | 6/2001 | Kumagai | |
| 6,467,563 B1 | * | 10/2002 | Ryan et al. | ................. 180/274 |
| 6,474,679 B2 | * | 11/2002 | Miyasaka et al. | ........ 280/730.1 |
| 6,547,279 B1 | * | 4/2003 | Amamori | ................. 280/743.1 |

FOREIGN PATENT DOCUMENTS

| | | |
|---|---|---|
| EP | 0 734 911 B1 | 2/1999 |
| JP | 9277895 | 10/1997 |

* cited by examiner

*Primary Examiner*—Faye M. Fleming
(74) *Attorney, Agent, or Firm*—Fitch, Even, Tabin & Flannery (57) ABSTRACT

An externally-developed air bag device is provided in which the air bag thereof is quickly and smoothly inflated in its entirety. Both end sides of the air bag 1 in the longitudinal direction that run over from the case 2 of the air bag 1, are folded back to the central side of the air bag along the short sides 2*b* of the case 2. Then, the portions running over from the long sides 2*a* of the case 2 are folded up in a bellows shape or in a roll shape, and are accommodated into the case 2. The gas from an inflator 4 substantially simultaneously inflates the central side of the air bag and both sides thereof in the longitudinal direction.

10 Claims, 9 Drawing Sheets

EXTERNALLY-DEVELOPED AIR BAG DEVICE

FIELD OF THE INVENTION

The present invention relates to an externally-developed air bag device for protecting a pedestrian, an occupant of a bicycle or a motorcycle (hereinafter referred to as "pedestrian or the like") when a car in running collides with the pedestrian, the bicycle, or the motorcycle.

BACKGROUND OF THE INVENTION

Figure 14:
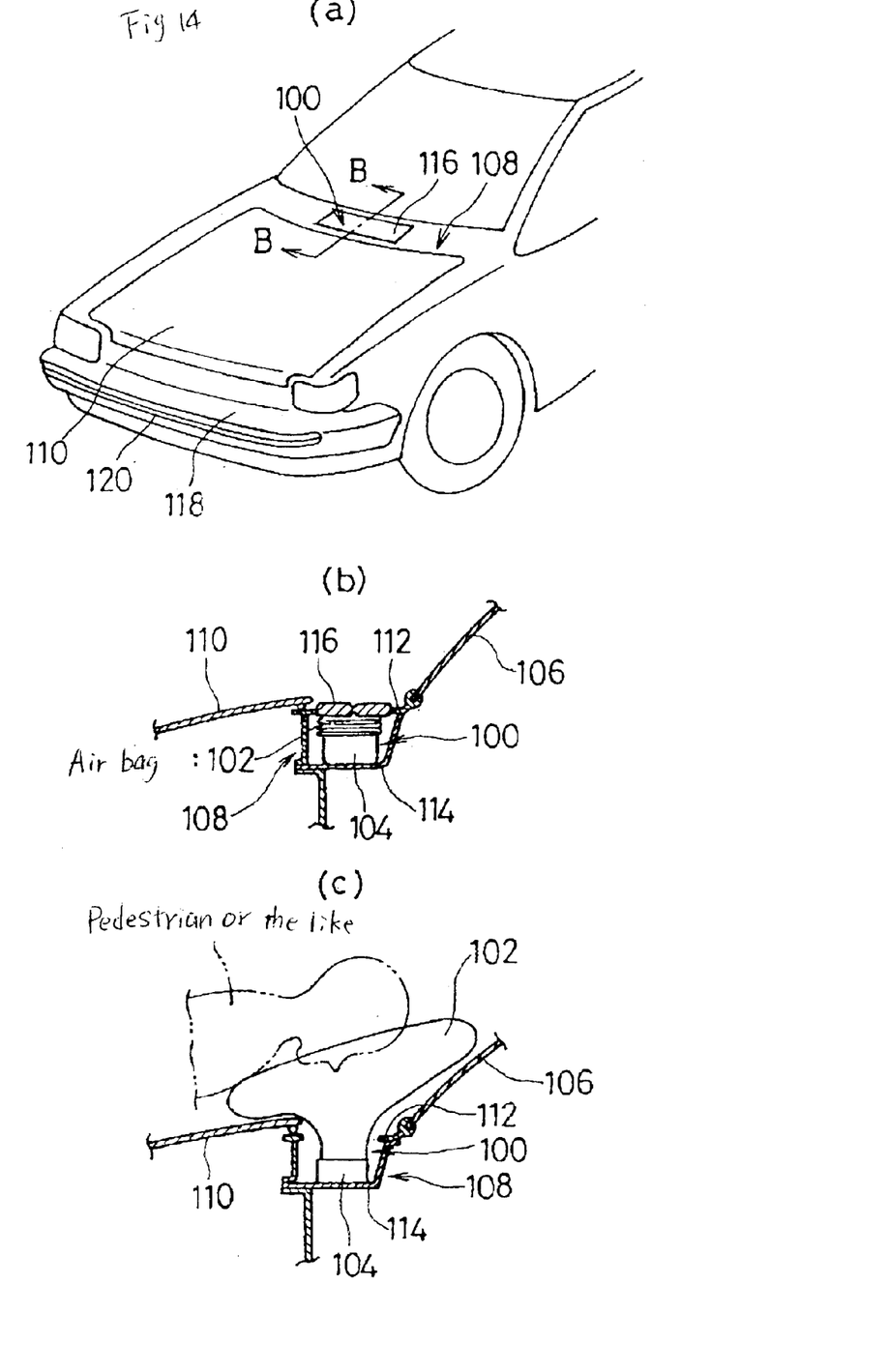
FIGS. 14(a) to 14(c) are representations explaining a conventional externally-developed air bag.
Figure 15:
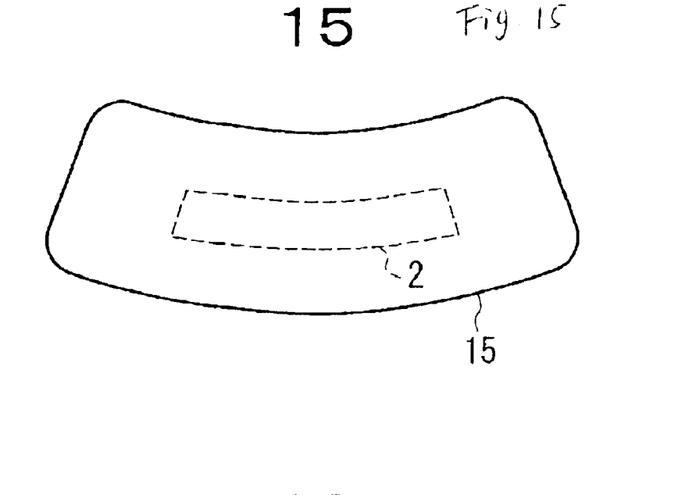
FIG. 15 is a plan view showing an example of another shaped air bag.
Figure 16:
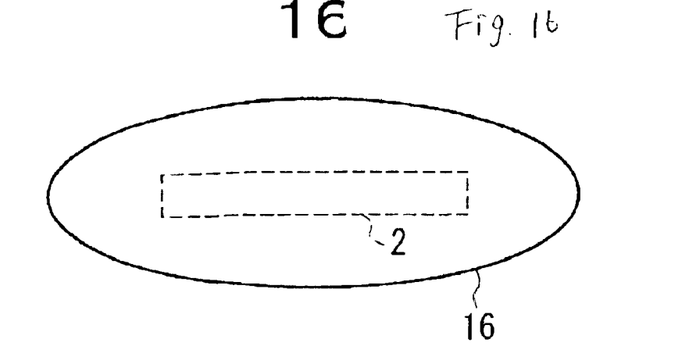
FIG. 16 is a plan view showing an example of still another shaped air bag.
Figure 17:
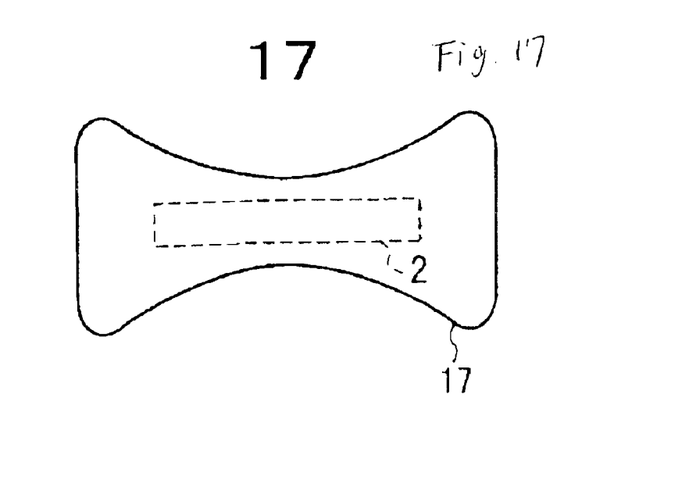
FIG. 17 is a plan view showing an example of a further shaped air bag.
Figure 18:
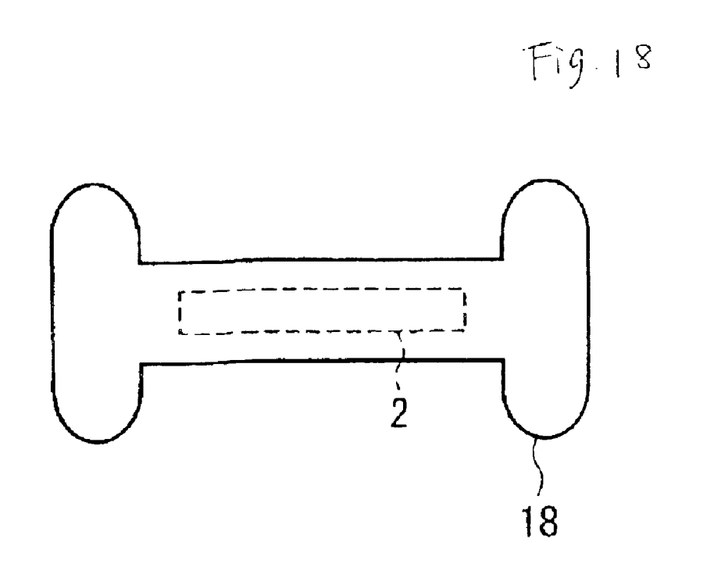
FIG. 18 is a plan view showing an example of a yet further shaped air bag.
Figure 19:
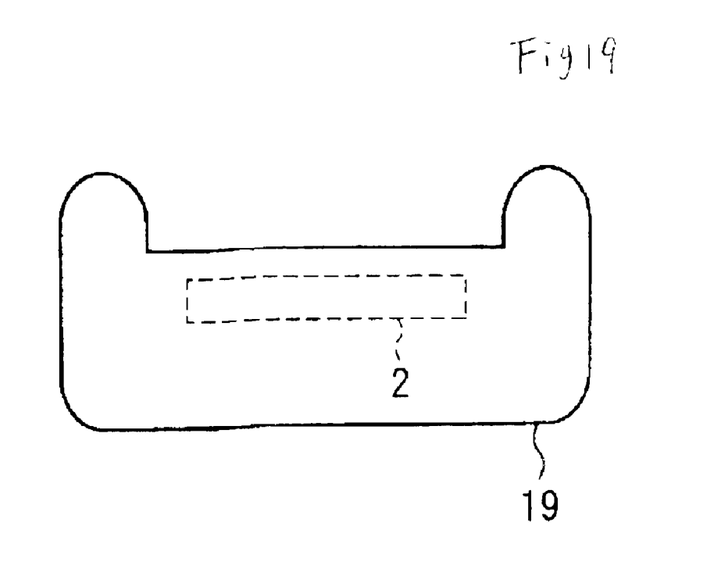
FIG. 19 is a plan view showing an example of another shaped air bag.

FIG. 14(a) is a perspective view showing the front portion of the body of a car equipped with a conventional externally developed air bag device, and FIGS. 14(b) and 14(c) are sectional views thereof taken along the line B—B in FIG. 14(a). Here, FIG. 14(b) shows a normal aspect of this externally-developed air bag device (i.e., the aspect thereof when the car is not in a state colliding with a pedestrian or the like), and FIG. 14(c) shows the aspect thereof when the air bag of this externally-developed air bag device has been developed.

The above-described externally-developed air bag 100 comprises an air bag 102 and an inflator 104 for inflating this air bag 102. The inflator 104 is disposed in a case (cowl top) 108 provided below the windshield (front window glass) 106 of the car, and normally the air bag 102 is accommodated in the cowl top 108 in a folded-up state.

The cowl top 108 includes a cowl top outer panel 112 exposed on the top surface of the front portion of the car body, and a cowl top inner panel 114 constituting the bottom portion of the cowl top 108. An opening for bulging out the air bag onto the top surface of the front portion of the car body is provided in the cowl top outer panel 112. The opening is disposed above the air bag 102 accommodated in the cowl top 108. Normally, a lid 116 is mounted over the opening so as to close the opening.

A contact detecting sensor 120 for detect that the car in running has collided with a pedestrian, a bicycle, or a motorcycle, is provided at the front end of the car body, such as the front bumper 118 of the car. The externally-developed air bag 100 is arranged so that, once the contact detecting sensor 120 has detected the occurrence of a collision, the inflator 104 comes into operation, and that a gas is introduced into the air bag 102 from the inflator 104, thereby inflating the air bag 102.

More specifically, once the car equipped with the externally-developed air bag 100 has collided with a pedestrian, a bicycle, or a motorcycle when the car is running, the contact detecting sensor 120 detects the occurrence of this collision, and the gas is introduced into the air bag 102 from the inflator 104, thereby inflating the air bag 102. The air bag 102 forces open the lid 116 mounted over the opening in the top surface of the cowl top 108, and bulges out onto the top surface of the front portion of the car body. Then, as shown in FIG. 14(c), the air bag 102 develops along the outer surface of the windshield 106 from the rear portion of a hood 110.

SUMMARY OF THE INVENTION

It is an object of the present invention to provide an externally-developed air bag device in which the air bag thereof is quickly inflated up to the completely developed shape.

The externally-developed air bag device according to the present invention comprises an air bag developable along the outer surface of a car; a case for accommodating the air bag; a lid for covering the case; an inflator for inflating the air bag. The above-described air bag has a long side direction and a short side direction intersecting the long side direction, in a flatly unfolded state. In this externally-developed air bag device, the air bag is made an intermediate folded body that is formed by folding back both end sides in the long side direction that run over from the case, toward the central side of the air bag. Then, the air bag is folded up in the short side direction and is accommodated into the case.

In this externally-developed air bag device, once the inflator has come into operation, a gas from the inflator is also directly introduced into both end sides of the air bag in the longitudinal direction (i.e., the portions running over from the case), thereby quickly inflating not only the central portion of the air bag but also both end sides thereof in the longitudinal direction.

In the present invention, it is preferable that the intermediate folded body of the air bag be folded up in the short side direction in a bellows shape or in a roll shape. This air bag folded up in a bellows shape or in a roll shape is smoothly inflated when the gas from the inflator is introduced thereinto.

DETAILED DESCRIPTION OF THE PREFERRED EMBODIMENTS

Hereinafter, the embodiments of the present invention will be described with reference to the drawings. FIGS. 1 to 6 are representations of a first embodiment.

Figure 1:
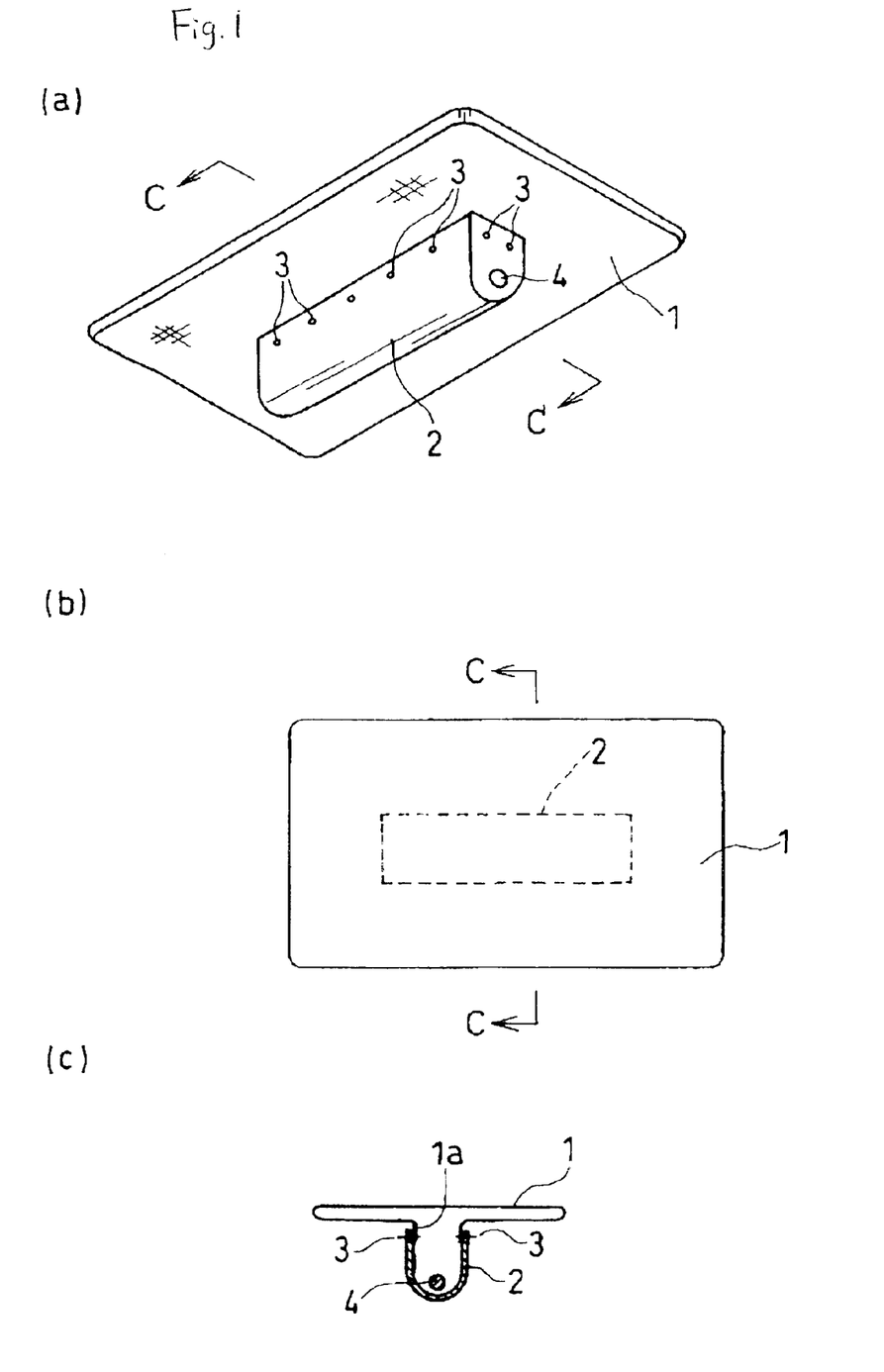
FIG. 1(a) is a perspective view of the air bag of an externally-developed air bag device according to an embodiment of the present invention, in which the air bag is flatly unfolded.
FIG. 1(b) is a plan view thereof.
FIG. 1(c) is a sectional view taken along the line C—C indicated in FIG. 1(a) and FIG. 1(b).
Figure 2:
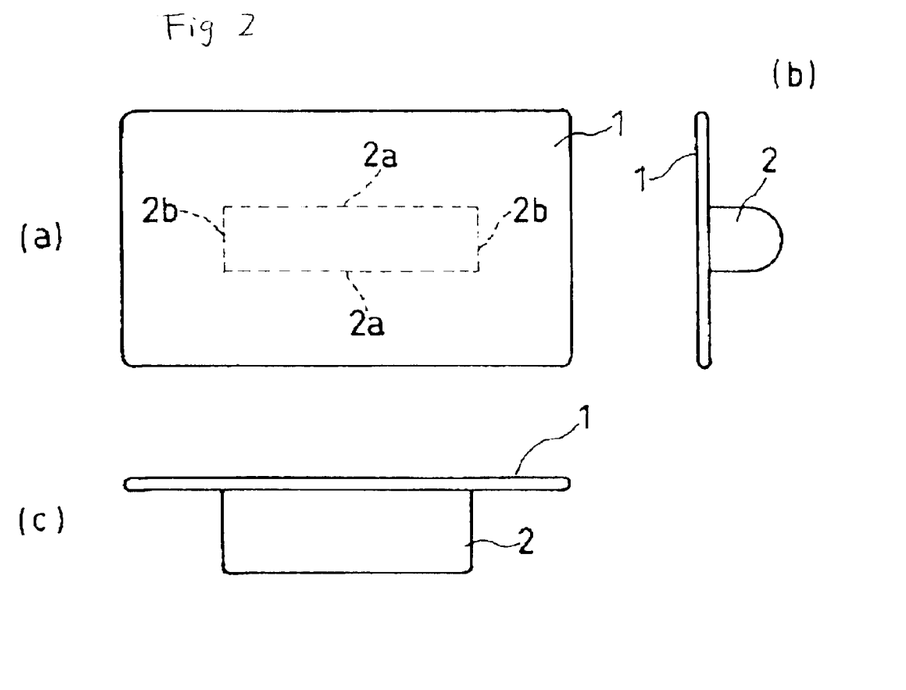
FIG. 2(a) is a plan view showing the air bag before being folded and a case according to this embodiment.
FIG. 2(b) is a right side view thereof.
FIG. 2(c) is a front view thereof.
Figure 3:
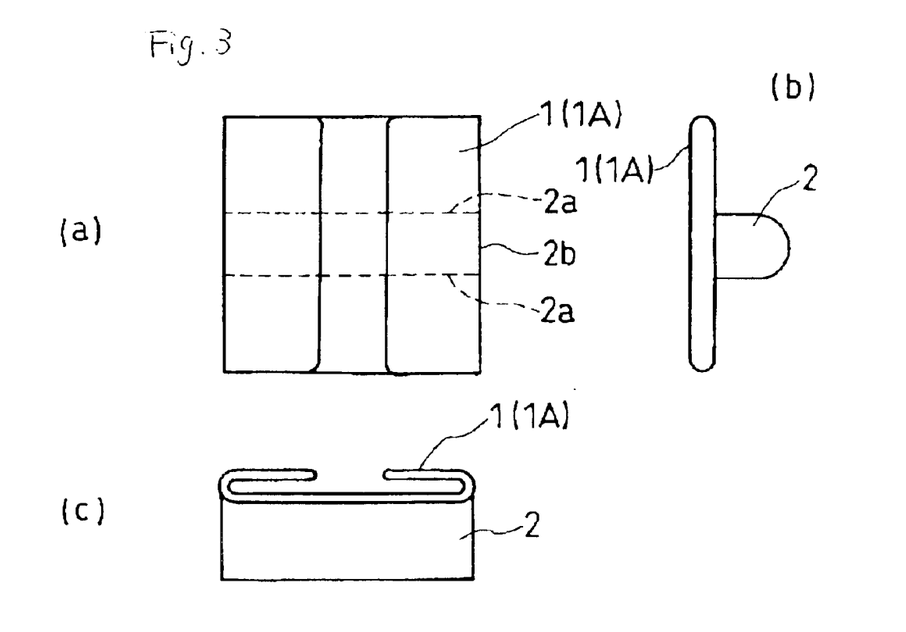
FIG. 3(a) is a plan view showing the air bag and the case when the air bag is being folded up.
FIG. 3(b) is a right side view thereof.
FIG. 3(c) is a front view thereof.
Figure 4:
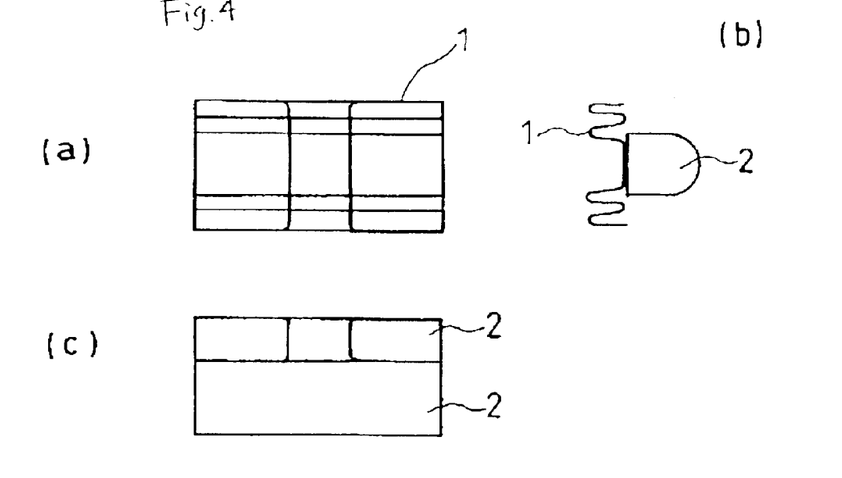
FIG. 4(a) is a plan view showing the air bag and the case when the air bag is being folded up.
FIG. 4(b) is a right side view thereof.
FIG. 4(c) is a front view thereof.
Figure 5:
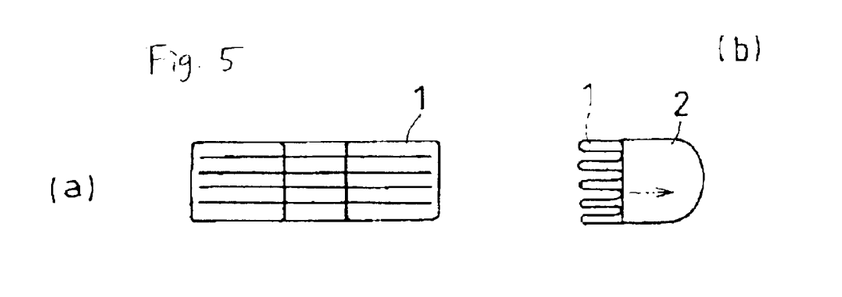
FIG. 5(a) is a plan view showing the air bag and the case when the air bag is being folded up.
FIG. 5(b) is a right side view thereof.

The present externally-developed air bag device includes an air bag 1, a case 2 for accommodating the air bag 1, fastening members 3 for fastening the edge portion of the gas receptacle 1a of the air bag 1 to the case 2, and an inflator 4 for inflating the air bag 1.

In this embodiment, the air bag 1 has a substantially rectangular shape in plan view, with a longitudinal direction and a short side direction in a flatly unfolded state, and has the gas receptacle provided at the center of the lower side surface thereof. The air bag 1 is larger than the case 2 and runs over from the case 2 over the entire periphery. The case 2 has also a substantially rectangular shape in a plan view, and the longitudinal direction of the case 2 points to that of the air bag 1. The case 2 is opened at the top surface thereof, and this opening is formed as a rectangular shape in a plan view. Reference numeral 2a denotes each of the long sides of the rectangular shape, and reference numeral 2b denotes each of the short sides thereof.

When the air bag 1 is to be folded up, firstly the air bag is flatly unfolded as shown in FIGS. 2(a) to 2(c), and then both end sides of the air bag 1 in the longitudinal direction are folded up toward the central side of the air bag along the short sides 2b, as shown in FIGS. 3(a) to 3(c). This folded air bag is designated as an intermediate folded body 1A.

Figure 6:
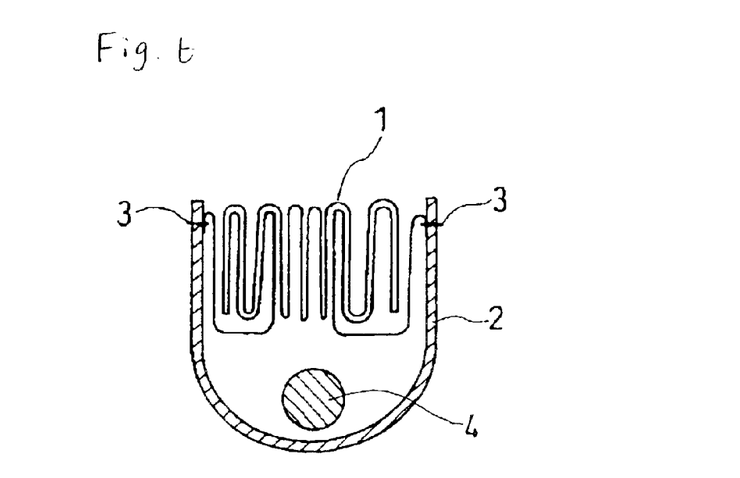
FIG. 6 is a sectional view showing the air bag when its folding-up has been completed.

Next, the portions running over from the long sides 2a of the case 2, of the intermediate folded body 1A, are folded up in a bellows shape as shown in FIGS. 4(a) to 4(c). The portions running over from both long sides 2a, which are folded up in a bellows shape, are opposed to each other at the center of the case 2. Then, as indicated by the arrow in FIG. 5(b), the above-described portions are accommodated into the case 2. Thereby, the folding-up of the air bag 1 is completed as shown in FIG. 6.

Figure 7:
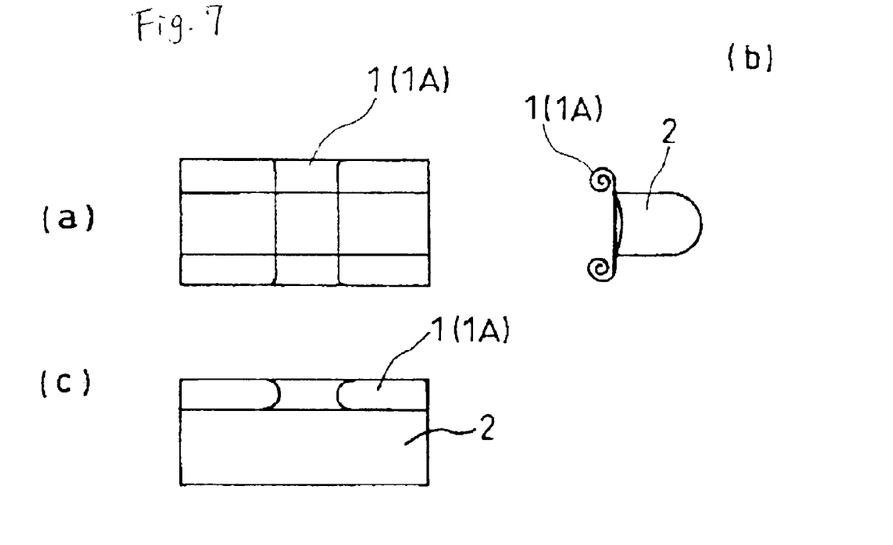
FIG. 7(a) is a plan view showing another air bag folding-up procedure.
FIG. 7(b) is a right side view thereof.
FIG. 7(c) is a front view thereof.
Figure 8:
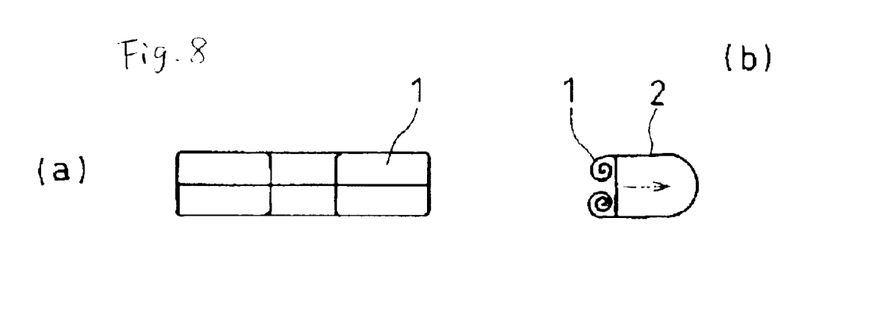
FIG. 8(a) is a plan view further illustrating the air bag folding-up procedure shown in FIG. 7.
FIG. 8(b) is a right side view thereof.
Figure 9:
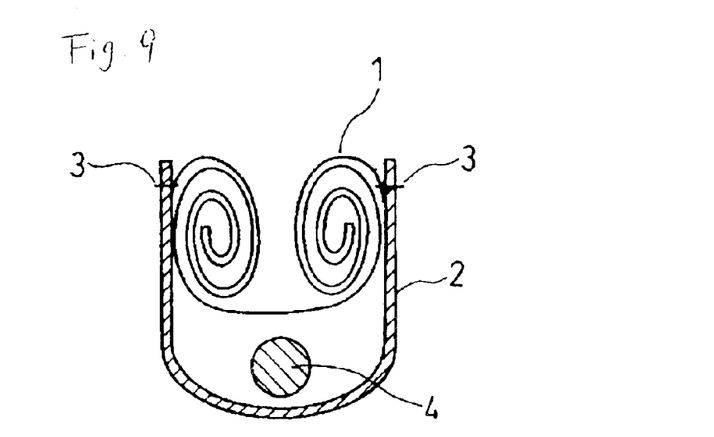
FIG. 9 is a sectional view illustrating the state in which the air bag folding-up procedure shown in FIGS. 7 and 8 has been completed.

In FIGS. 2 to 6, the portions running over from the long sides 2a of the case 2, of the intermediate folded body 1A, are folded up in a bellows shape. Alternatively, however, these portions may be folded up in a roll shape as shown in FIGS. 7 to 9.

Specifically, as shown in FIG. 7(a) to 7(c), the portions running over from the long sides 2a of the case 2 are rolled in a roll shape so that the central axis of each roll becomes parallel to the long sides 2a of the case. Next, two roll-shape portions formed as shown in FIGS. 8(a) and 8(b), are disposed on the case 2, and then they are accommodated into the case 2 as indicated by the arrow in FIG. 8(b). Thereby, the air bag 1 constitutes a folded body shown in FIG. 9. In FIG. 9, the two roll-shape portions are represented as having a spacing therebetween, and the roll-shape portion itself is also represented as having spacings therein. This is because FIG. 9 is a view in a schematic form. In actuality, the air bag 1 is folded up with the two roll-shape portions being in contact with each other, and with the roll-shape portion itself having no spacing therein, as a matter of course.

Figure 10:
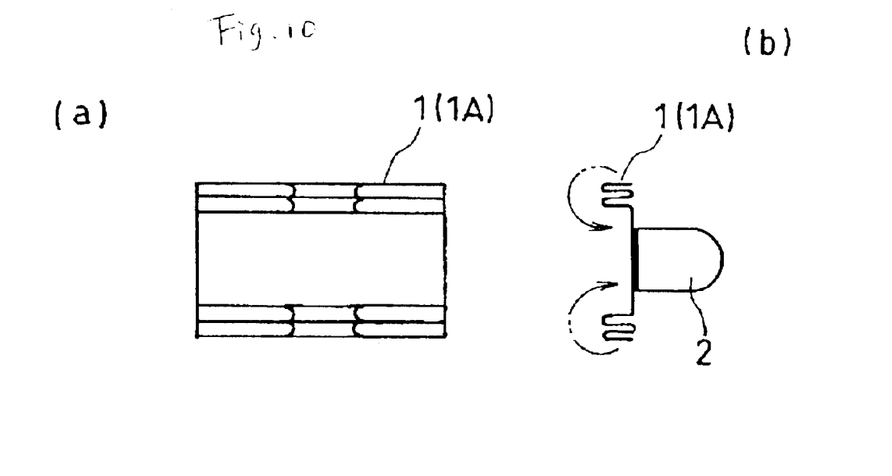
FIG. 10(a) is a plan view showing a still another air bag folding-up procedure.
FIG. 10(b) is a right side view thereof.
Figure 11:
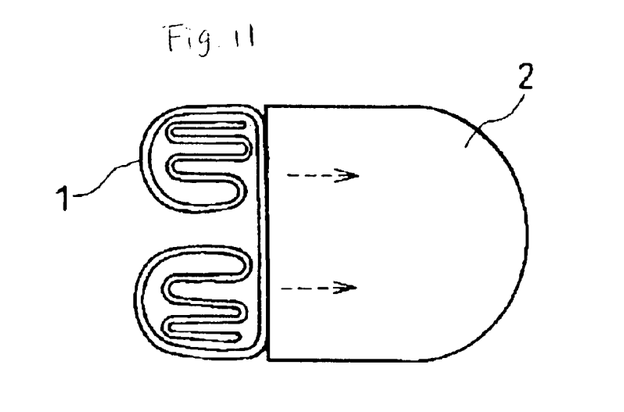
FIG. 11 is a sectional view further illustrating the air bag folding-up procedure shown in FIG. 10.
Figure 12:
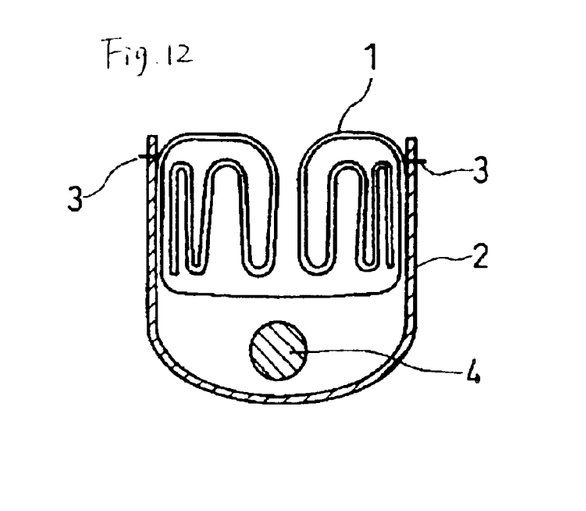
FIG. 12 is a sectional view illustrating the state in which the air bag folding-up procedure shown in FIGS. 10 and 11 has been completed.

In the present invention, as shown in FIGS. 10 to 12, the folding-up in a bellows shape and that in a roll shape may be combined with each other.

Specifically, as shown in FIGS. 10(a) and 10(b), firstly the portions running over from the case 2 of the intermediate folded body 1A, are folded up in a bellows shape up to the vicinity of the opening in the case 2. Next, as indicated by the arcuate arrows in FIG. 10(b), the above-described bellows-shaped folded body is rolled in a roll shape, and as shown in FIG. 11, two roll shape portions are positioned on the top surface of the case 2. Thereafter, as indicated by the linear arrows in FIG. 11, each of the roll shaped portions is accommodated into the case 2. Thereby, the air bag folded body shown in FIG. 12 is achieved.

In any of the folded bodies shown in FIGS. 6, 9, and 12, once the inflator 4 has come into operation, the gas from the inflator is introduced into not only the central portion of the air bag 1, but also substantially simultaneously into both end sides thereof in the longitudinal direction, thereby substantially simultaneously starting to inflate the central side of the air bag and both end sides thereof in the longitudinal direction.

Figure 13:
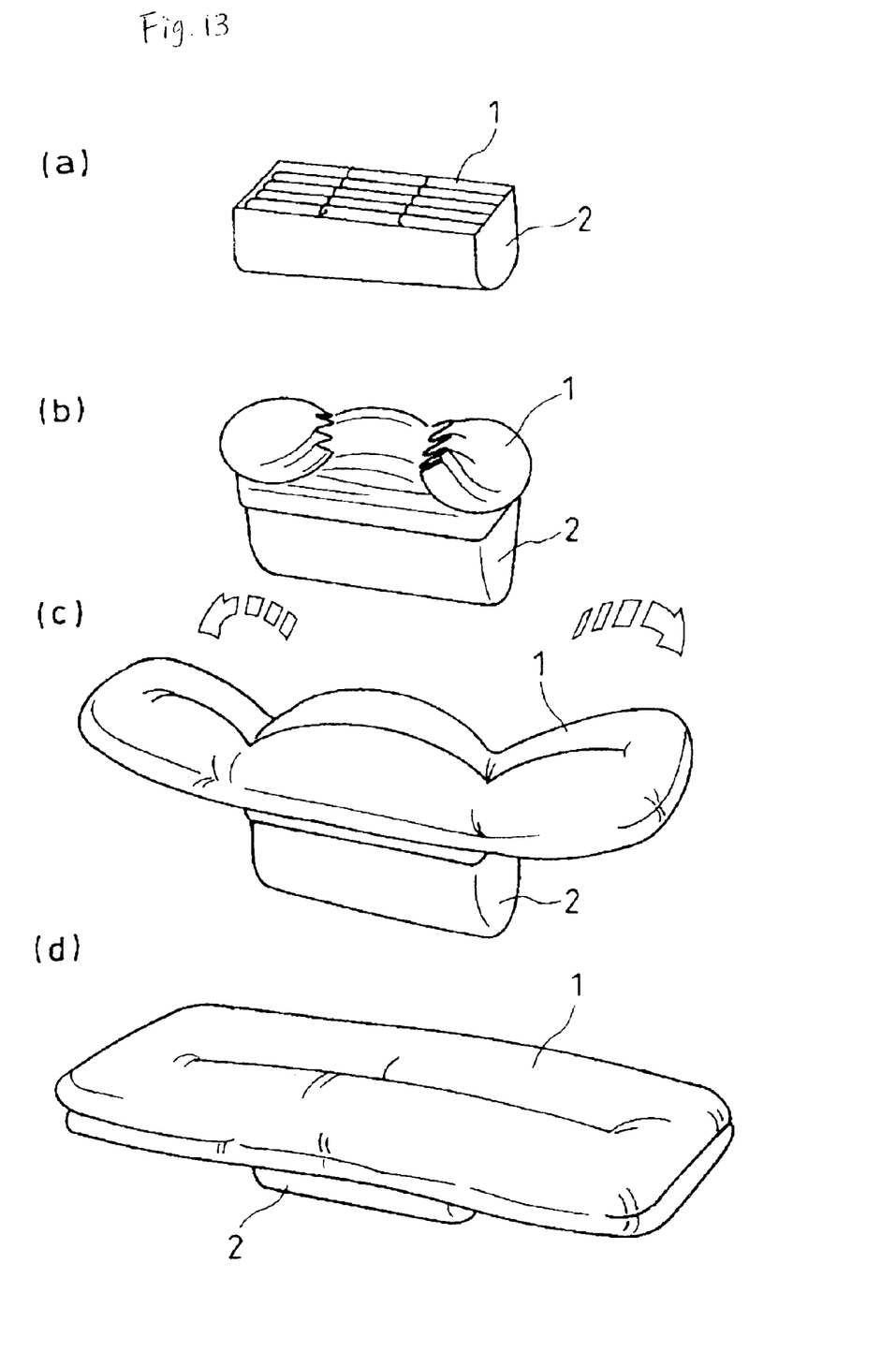
FIGS. 13(a) to 13(d) are perspective views illustrating the inflating process of the air bag folded body shown in FIG. 6.

FIGS. 13(b) to 13(d) are perspective views showing stages of the inflating process of the air bag folded body shown in FIG. 6. FIG. 13(a) shows a state of the air bag folded body before being inflated. With the inflator 4 coming into operation, both end sides of the air bag 1 in the longitudinal direction are inflated substantially simultaneously with the central side between both end sides, as shown in FIG. 13(b) and 13(c). While not shown in figures, the air bag folded bodies in FIGS. 9 and 12 are also inflated in similar manners. In the air bag inflating through such stages of the inflating process, in the condition immediately before the completion of the inflation (FIG. 13(c)), not only the central side of the air bag but also both end sides thereof in the longitudinal direction are just about to complete the inflation thereof, and thereupon, the central side of the air bag and both end sides thereof in the longitudinal direction substantially simultaneously comes into a state of completing the inflation, as shown in FIG. 13(d). Therefore, there is no risk that, immediately before the completion of the inflation, both end sides of the air bag in the longitudinal direction flutter in a manner such as to run wild. In contrast, if both end sides of the air bag 1 in the longitudinal direction completes the inflation thereof later than the central side, the gas might flow from the central side where the inflation has already been completed, into both end sides of the air bag 1 in the longitudinal direction where the inflation has not yet been completed, so that both end sides of the air bag 1 in the longitudinal direction might heavily flutter upward and downward in the conditions in FIGS. 13(c) to 13(d). However, according to the present invention, the air bag smoothly completes its inflation in its entirety, without generating such fluttering on both end sides of the air bag 1 in the longitudinal direction.

The externally-developed air bag according to the present invention can be disposed at various places including the hood of the car, and there is no limitation on the installation positions thereof. In the present invention, a tether belt or the like may be provided within the air bag in order to flatly inflate the air bag on the outer surface of the car.

The above-described embodiments are some examples of the present invention. It should be understood that the present invention can assume configurations other than those of the illustrated embodiments.

For example, although the air bag has a rectangular shape in a plan view in the above-described embodiments, the shape of the air bag in plan view in the present invention is not restricted to the rectangular shape. Various shapes may be adopted besides this shape. FIGS. 15 to 19 are plan views showing examples of them. The air bag 15 in FIG. 15 has a substantially fan shape, the air bag 16 in FIG. 16 has a substantially elliptical shape, the air bag 17 in FIG. 17 has a substantially hand drum shape, the air bag 18 in FIG. 18 has a substantially H-shape, and the air bag 19 in FIG. 19 has a substantially U-shape. Of cause, the present invention can assume other various shapes.

As is evident from the foregoing, according to the present invention, an externally-developed air bag device in which the air bag thereof is quickly and smoothly inflated in its entirety.

I claim:

1. An externally-deployed air bag device, comprising:

an air bag deployable along the outer surface of a car, said air bag extending in a longitudinal direction to opposite end portions spaced by a central portion of the bag and extending in a transverse direction intersecting said longitudinal direction with the air bag in a substantially flat unfolded state, a case for accommodating said air bag with the case being smaller than the air bag in the unfolded state thereof so that the air bag end portions extend beyond the case;

a lid for covering said case;

an inflator for inflating said air bag; and an intermediate folded body of the air bag that is formed by folding back both end portions in said longitudinal direction toward the central portion of the air bag, and wherein said air bag is then folded up in said transverse direction to be accommodated into the case.

2. An externally-deployed air bag device according to claim 1, wherein said intermediate folded body is folded up in said transverse direction in a bellows shape or in a roll shape.

3. An air bag device for an automobile, the air bag device comprising:

a case having a predetermined configuration including length and width dimensions;

an air bag that is formed into an intermediate folded body for being contained in the case prior to deployment, the air bag having predetermined length and width dimensions in an unfolded state that are oriented to extend in the same general direction as corresponding case dimensions and which are greater than the corresponding case dimensions;

an inflator in the case for inflating the air bag;

a center portion and opposite lateral end portions of the air bag intermediate body with the end portions folded transversely to the air bag length toward the center portion so that the intermediate body has a smaller length than the unfolded air bag length with the intermediate body length being sized to fit into the length of the case; and a plurality of length portions that are subsequent to the folding of the end portions folded transversely to the air bag width through the center portion to extend to the folded end portions such that the air bag folded body has a smaller width than the unfolded air bag width with the intermediate body width being sized to fit into the width of the case and the center and end portions are substantially fully inflated simultaneously with air bag deployment.

4. The air bag device of claim 3 wherein the case predetermined configuration comprises an elongate configuration.

5. The air bag device of claim 3 wherein the case predetermined configuration is rectangular with the length dimension being greater than the width dimension thereof.

6. The air bag device of claim 3 wherein the length portions are folded both through the center portion and the lateral end portions.

7. The air bag device of claim 3 wherein each end portion is folded along a single fold line extending along the width dimension of the air bag and disposed between the respective end portions and the center portion and a plurality of fold lines extending along the length dimension of the air bag.

8. The air bag device of claim 3 wherein the plurality of length portions form flow paths for gas to fully inflate the air bag center and end portions substantially simultaneously with the end portions pivoting away from the center portion and airflow from the center portion to the end portions and consequent fluttering thereof being minimized with air bag deployment.

9. The air bag device of claim 3 wherein the case is adapted to be positioned below an exterior surface of the automobile with the inflator lower than the air bag folded body in the case, and a sensor for being mounted to the automobile to sense external impacts therewith and cause operation of the inflator to deploy the air bag upwardly and out along the automobile external surface.

10. The air bag device of claim 3 wherein the length portions are folded to have one of a bellows configuration and a roll configuration.

* * * * *